US012656232B2

(12) United States Patent
Leikin et al.

(10) Patent No.: US 12,656,232 B2
(45) Date of Patent: Jun. 16, 2026

(54) ANALYTICAL NEBULIZER

(71) Applicant: Texas Scientific Products LLC, Justin, TX (US)

(72) Inventors: Sergei Leikin, Centerville, MA (US); Steven D. Sweat, Cedaredge, CO (US)

(73) Assignee: Texas Scientific Products LLC, Justin, TX (US)

( * ) Notice: Subject to any disclaimer, the term of this patent is extended or adjusted under 35 U.S.C. 154(b) by 837 days.

(21) Appl. No.: 17/811,592

(22) Filed: Jul. 11, 2022

(65) Prior Publication Data

US 2023/0003623 A1 Jan. 5, 2023

Related U.S. Application Data

(63) Continuation of application No. PCT/US2021/014026, filed on Jan. 19, 2021.

(60) Provisional application No. 62/963,025, filed on Jan. 18, 2020.

(51) Int. Cl.
*B05B 1/26* (2006.01)
*B05B 7/04* (2006.01)
*G01N 1/38* (2006.01)

(52) U.S. Cl.
CPC .............. *G01N 1/38* (2013.01); *B05B 1/267* (2013.01); *B05B 7/0483* (2013.01); *G01N 2001/387* (2013.01)

(58) Field of Classification Search
CPC ..... B05B 1/267; B05B 7/0483; B05B 7/0458; B05B 7/0466; B05B 17/04; H01J 49/04; H01J 49/0404; G01N 1/38; G01N 2001/387
See application file for complete search history.

(56) References Cited

U.S. PATENT DOCUMENTS

| | | | | |
|---|---|---|---|---|
| 4,206,160 | A | * | 6/1980 | Suddendorf ............ B01F 23/21 261/78.2 |
| 4,798,190 | A | | 1/1989 | Vaznaian et al. |
| 4,880,164 | A | * | 11/1989 | Noordermeer ............ B05B 7/08 239/DIG. 19 |
| 5,074,244 | A | * | 12/1991 | Byers .................... B05B 7/0846 118/712 |
| 5,411,208 | A | * | 5/1995 | Burgener ............ B01F 23/2132 261/78.2 |

(Continued)

FOREIGN PATENT DOCUMENTS

| | | | |
|---|---|---|---|
| CS | 245752 | B2 | 10/1986 |
| JP | 2011196697 | A | 10/2011 |
| KR | 101151165 | B1 | 6/2012 |

*Primary Examiner* — Joseph A Greenlund
(74) *Attorney, Agent, or Firm* — Umair A. Qadeer

(57) ABSTRACT

A thin film induction nebulizer is disclosed herein. The nebulizer has a gas capillary and a liquid capillary that are aligned in the same direction within a nebulizer housing and are substantially aligned with a main axis of the nebulizer housing. The nebulizer includes a liquid opening configured to allow liquid to exit the liquid capillary and a gas orifice configured to allow gas to exit the gas capillary. The liquid capillary opens into a chamber that is formed from a liquid channel having a roughened surface and a cover plate. The cover plate interfaces with the liquid channel to partially seal the chamber. The chamber includes an opening where the liquid opening opens into the chamber and also includes another opening proximal to the gas orifice. The end of the nebulizer housing that is proximal to the liquid opening and the gas orifice includes two angled exterior surfaces.

20 Claims, 5 Drawing Sheets

100

(56)  References Cited

U.S. PATENT DOCUMENTS

| 5,868,321  A  *   2/1999 | Haruch  ................. B05B 7/0466 |
| | 239/432 |
| 5,884,846  A     3/1999 | Tan |
| 5,899,387  A  *   5/1999 | Haruch  ................. B05B 7/0458 |
| | 239/419 |
| 6,032,876  A     3/2000 | Bertsch et al. |
| 6,511,850  B1    1/2003 | Vigh et al. |
| 6,634,572  B1 *  10/2003 | Burgener  ............. B05B 7/2483 |
| | 239/423 |
| 6,859,272  B2 *   2/2005 | Rutzke  ................... H01J 49/04 |
| | 239/518 |
| 7,141,788  B2    11/2006 | Hirabayashi et al. |
| 7,798,475  B2 *   9/2010 | Demiruker  ......... B01F 25/4422 |
| | 261/78.2 |
| 8,167,279  B2 *   5/2012 | Demiruker  ......... B01F 25/4422 |
| | 261/78.2 |
| 10,151,281  B2 *  12/2018 | Amaya  ................. B05B 7/0466 |
| 11,944,993  B1 *   4/2024 | Burgener  ............. B05B 7/0815 |
| 2003/0213907  A1 *  11/2003 | Rutzke  ................... H01J 49/04 |
| | 250/288 |
| 2004/0262429  A1 *  12/2004 | Bauer  .................. B05B 7/0892 |
| | 239/398 |
| 2005/0284957  A1 *  12/2005 | Haruch  .................... B05B 7/10 |
| | 239/290 |
| 2006/0038041  A1 *   2/2006 | Huffman  .............. B05B 7/0892 |
| | 239/398 |
| 2006/0278736  A1 *  12/2006 | Reilly  .................. A62C 31/005 |
| | 239/542 |
| 2007/0221582  A1    9/2007 | Holland et al. |
| 2013/0266908  A1 *  10/2013 | Casabonne  ............ A61C 3/025 |
| | 433/88 |
| 2017/0032949  A1 *   2/2017 | Covey  ................. H01J 49/0404 |
| 2020/0360944  A1    11/2020 | Ros et al. |
| 2021/0285885  A1 *   9/2021 | Leikin  ................. G01N 21/714 |

* cited by examiner

100

100

100

ANALYTICAL NEBULIZER

CROSS-REFERENCE TO RELATED APPLICATIONS

This application is a continuation of PCT Patent Application No. PCT/US2021/014026, filed on Jan. 19, 2021, which claims the benefit of U.S. Provisional Patent Application Ser. No. 62/963,025, filed on Jan. 18, 2020, the disclosures of which are hereby incorporated herein in their entireties by reference.

BACKGROUND

Field of the Invention

The present disclosure relates to nebulizers for analytical use.

Description of the Related Art

A nebulizer is an apparatus that converts a liquid into a fine mist. An analytical nebulizer is designed to deliver a line mist to introduce a sample into the detection system of a spectrometric instrument. Analytical nebulizers are the preferred apparatus for sample introduction in various types of spectroscopy, including inductively coupled plasma atomic emission spectroscopy (ICP-AES) inductively coupled plasma mass spectrometry (ICP-MS), and atomic absorption spectroscopy (AAS).

Analytical nebulizers generally provide a consistent and reproducible method of sample introduction. A sample must be in liquid form before it is introduced into a nebulizer. Solid samples may be dissolved in an appropriate solvent, digested in acid, or suspended in a liquid carrier. An important consideration for analytical nebulizer design is the size of the droplets generated. Smaller droplets lead to increased signal, and larger droplets must be removed before introduction of the mist into the detection chamber of a spectroscopic instrument, Thus, analytical nebulizers that generate a higher percentage of small droplets generally lead to increased signal intensity and thereby provide superior performance. In addition, analytical nebulizers will preferably produce consistent results over time without requiring frequent cleaning, and such long-term stability of results is another measure of nebulizer performance.

Nebulizer designs include both pneumatic and ultrasonic designs. Pneumatic nebulizers may use induction to draw liquid into a gas stream or may alternatively not require induction to draw liquid into a gas stream. Pneumatic induction nebulizers include concentric, cross flow, entrained, Babington and V-groove, and parallel path designs. Pneumatic non-induction nebulizers include enhanced parallel path, Hildebrand grid, and flow blurring designs. Ultrasonic nebulizers include vibrating transducer and vibrating mesh designs.

Pneumatic induction nebulizers generally operate in the following manner, relying on the Venturi effect to draw liquid into a gas stream. Gas at a higher pressure exits from a small orifice into gas at a lower pressure and forms a gas stream in the lower pressure zone. This pushes the lower pressure gas away from the orifice and generates gas flow in the lower pressure gas zone. This in turn draws some of the lower pressure gas into the higher pressure gas stream. The draw of the lower pressure gas creates lower pressure at the orifice. This creates considerable suction at the orifice, the extent of which depends on the differential pressures, the size of the orifice, and the shape of the orifice and surrounding apparatus. In some nebulizer designs, suction near the orifice is used to draw the liquid into the gas stream, and the liquid breaks apart into small droplets in the process. In other nebulizer designs, the liquid is pumped into the gas stream and the liquid then breaks apart into small droplets. The liquid may be pumped using, for example, a peristaltic pump.

Concentric nebulizers use a central capillary with a liquid and an outer capillary with a gas, or alternatively a central capillary with a gas and an outer capillary with a liquid. The gas draws the liquid into the gas stream via suction, and the liquid breaks apart into a line mist as it moves into the gas stream. Concentric nebulizers are generally designed with a central liquid capillary. Concentric nebulizers typically generate a fine mist suitable for use with spectroscopic instruments and thereby generally provide good analytical sensitivity and precision for suitable samples introduced into spectroscopic instruments using concentric nebulizers. Concentric nebulizers are also generally suitable for use at low flow rates, without compromising efficiency of sample introduction. However, the general design features of concentric nebulizers also present various drawbacks. The most significant drawback associated with the use of a concentric nebulizer is that the inner diameter of the liquid capillary must be small, which frequently results in at least partial plugging of the liquid capillary and concomitant partial plugging of the outer gas capillary. This both reduces effectiveness of the nebulizer and introduces inconsistency in its performance.

Cross flow nebulizers use a gas capillary that is set perpendicular to a liquid capillary. Gas flows across the liquid capillary to produce a low pressure that draws the liquid into the gas stream. The suction is typically similar to the suction produced in a concentric nebulizer. Cross flow nebulizers allow for use of a liquid capillary with a larger inner diameter than is used in concentric nebulizers. This allows more particles to pass through the capillary without plugging the nebulizer. However, this also results in a mist that is generally not as fine or consistent as the mist generated using a concentric nebulizer.

Entrained nebulizers use a method of generating atomized liquid particles that involves mixing gas and liquid within the system and emitting a combined liquid-gas flow.

Babington and V-groove nebulizers are both similar to cross flow nebulizers in that liquid is delivered perpendicular to a gas capillary. However, in Babington and V-groove nebulizers, liquid flows downward on account of gravity and past a gas orifice. In the Babington design liquid flows down an inclined sheet, and in the V-groove design liquid flows downward through a V-shaped groove. The gas exiting the orifice creates induction to draw the liquid into the gas flow and form a fine mist. These designs eliminate the need for a small inner diameter liquid capillary and are thus typically more resistant to plugging. Both the Babington and V-groove designs use pumping to feed the liquid into the device and then rely on gravity to draw liquid toward the gas orifice. For Babington and V-groove nebulizers to work properly, the inclined sheet or groove must have the correct orientation, Otherwise the liquid will not flow past the gas stream and no induction and subsequent atomization of the liquid will occur. In addition, the droplets generated using Babington and V-groove nebulizers are generally larger than the droplets produced by concentric and cross flow nebulizers. V-groove droplets are also less consistent. Further, in the Babington design, most of the liquid will not be pulled into the gas flow and thus will be wasted. Thus, typical Babington nebulizers only work well with liquids that have low surface tension.

Parallel path nebulizers use parallel gas and liquid capillaries. At the tip of the nebulizer, liquid is pulled into the gas stream by induction to generate a mist. This requires Close proximity between the liquid capillary opening and gas orifice.

Enhanced parallel path nebulizers also use parallel gas and liquid capillaries. However, unlike in parallel path nebulizers, liquid is not simply pulled into a gas stream by induction. Rather, a spout extends into the gas stream and liquid is pulled into the gas stream by surface tension along the spout. The liquid interacts with the gas at the center of the gas stream where the velocity of the gas is highest. This produces direct energy transfer from the gas to the liquid, and thereby generates a mist with small droplets.

Hildebrand grid nebulizers use a gas stream that flows through a liquid upon exiting an orifice. To distribute the liquid, two platinum grids are situated in front of the orifice. When the gas stream impacts the liquid in the grid, turbulence is generated and a mist is formed. Droplet sizes are similar to concentric nebulizers. However, the use of platinum grids requires extended rinsing between samples to reduce carryover between samples. In addition, platinum strongly absorbs certain elements and compounds, which further limits the utility Hildebrand grid nebulizers.

Flow blurring nebulizers use a liquid capillary surrounded by a gas capillary, as in concentric nebulizers. However, turbulence in the liquid capillary causes the liquid contained therein to break apart before it interacts with the gas stream exiting the gas capillary. This results in a high percentage of small droplets and higher sensitivity than standard concentric nebulizers. However, turbulence is inconsistent by nature, and thus flow blurring nebulizers have less long-term stability than other designs.

Ultrasonic nebulizers use high frequency vibrating transducers to impart energy to liquid samples. This leads to efficient energy transfer and small droplet sizes. However, ultrasonic nebulizers are expensive, require periodic transducer replacement, and are not effective for use with high salt samples or small samples.

Modern ICP-MS instruments are increasingly geared toward handling samples with a high content of total dissolved solids (IDS). These instruments are also typically operated at a low sample uptake rate. The current industry standard uptake rate is 0.400 mL/min. The most commonly used nebulizers for ICP-MS are concentric nebulizers. Concentric nebulizers typically have good transport efficiency characteristics at low sample uptake rates. The high efficiency combined with the precision offered by concentric nebulizers allows low detection limits for samples introduced using concentric nebulizers. Since low detection limits are a key advantage of ICP-MS, among the currently available nebulizer designs concentric nebulizers are often the default selection for sample introduction into modern ICP-MS instruments.

However, as discussed above, concentric nebulizers are highly prone to plugging. As a result, manufacturers of concentric nebulizers often recommend very low particle size limits in the technical specifications—some of these limits are as low as 75 μm. To achieve the low sample uptake rates required by most ICP-MS applications with a concentric nebulizer requires that the liquid capillary of the nebulizer have a particularly narrow inner diameter, which is typically narrower than for concentric nebulizers used in other applications. As a result, plugging becomes an even greater problem and affects the reliability of using a concentric nebulizer for introducing samples that contain any appreciable amount of particulates. This limits the utility of concentric nebulizers for ICP-MS sample introduction to mostly particulate-free samples.

U.S. Pat. No. 6,859,272 to Rutzke, et al. discloses a non-concentric nebulizer that is capable of use in applications requiring low sample uptake rates.

While other nebulizer designs are suited for the introduction of high solid content samples, these designs typically exhibit low efficiency at low sample uptake rates. To overcome the limited efficiency at low sample uptake rates, the designs of nebulizers that are ordinarily suitable for use with high solid content samples are typically modified to reduce the inner diameter of the liquid capillary. This increases the likelihood of plugging. In addition, if the inner diameter of the liquid capillary is too large, the liquid sample is typically delivered in sporadic bursts rather than as a consistent flow. This affects the consistency of the nebulizer for sample introduction and results in inconsistent performance of the ICP-MS instrument.

Thus, there remains a need for a nebulizer that overcomes the limitations of existing nebulizer designs for applications requiring low sample uptake rates and tolerance of high TDS content and/or particulate-containing samples.

SUMMARY

A thin film induction nebulizer is disclosed herein. The disclosed nebulizer has a gas capillary and a liquid capillary that are aligned in the same direction within a nebulizer housing and are substantially aligned with a main axis of the nebulizer housing. The nebulizer includes a liquid opening configured to allow liquid to exit the liquid capillary and a gas orifice configured to allow gas to exit the gas capillary. The liquid capillary opens into a chamber that is formed from a liquid channel and a cover plate. The cover plate interfaces with the liquid channel to partially seal the chamber. The chamber includes an opening where the liquid opening opens into the chamber and also includes another opening proximal to the gas orifice. The liquid channel has a roughened surface. The liquid channel may be partially situated between the liquid opening and the gas orifice and also extend beyond the gas orifice in a direction away from the liquid opening. Alternatively, the liquid channel may be situated entirely between the liquid opening and the gas orifice. The end of the nebulizer housing that is proximal to the liquid opening and the gas orifice includes two angled exterior surfaces. The angled exterior surfaces include a liquid-side surface and a gas-side surface. The liquid-side surface is positioned at an obtuse angle with respect to the main axis of the nebulizer housing, where the angle is measured at the outside edge of the nebulizer housing. The gas-side surface is also positioned at an obtuse angle with respect to the main axis of the nebulizer housing, where the angle is measured at the outside edge of the nebulizer housing. The liquid-side surface and the gas-side surface may be positioned orthogonally to each other, or alternatively may be positioned at an acute or obtuse angle with respect to each other. The cover plate has an inner surface and an outer surface. The cover plate may extend along the same plane as the liquid-side surface, or may alternatively extend along a plane substantially parallel to the plane of the liquid-side surface. The cover plate may extend along the plane of the liquid-side surface from an interface between an edge of the liquid-side surface that is aligned along the main axis of the nebulizer housing with the edge of the liquid opening that is substantially distal from the gas orifice, along an interface with the liquid channel, and toward the opening of the chamber that is proximal to the gas orifice. In some embodiments, the cover plate may form an integrated part of the liquid-side surface.

The roughened surface of the liquid channel allows wetting of the liquid channel with liquid that exits from the liquid opening. The liquid may preferably form a thin film within the liquid channel upon exiting the liquid opening.

A liquid that is introduced into the chamber from the liquid capillary via the liquid opening may form a thin film on the liquid channel. The liquid may be drawn into the gas stream by both induction and suction. Because the chamber is partially enclosed, induction will be increased as compared to an unenclosed chamber. This will lead to some suction into the gas stream of liquid that is forming a thin film in the liquid channel, and will also increase the consistency of liquid being drawn into the gas stream.

The disclosed nebulizer may use a large inner diameter liquid capillary without negative impacts on its performance. This is because the induction and suction draws liquid from the thin film rather than directly from the liquid opening. Typically, a large inner diameter liquid capillary leads to inconsistency in sample delivery at low sample uptake rates. Here, because the liquid is drawn from the thin film and induction is increased in the chamber, the sample delivery will be highly consistent even at low sample uptake rates.

Because the liquid capillary has a large inner diameter, the disclosed nebulizer is highly suitable far introducing unfiltered liquid samples and liquid samples with a high salt content. The large inner diameter liquid capillary of the disclosed nebulizer more reliably handles samples that include particulates than current nebulizer designs. Moreover, the liquid capillary may preferably have the same inner diameter along the length of the capillary, without restrictions that narrow the capillary diameter. The inner diameter of the liquid capillary may be comparable to that of V-groove nebulizers, while the disclosed nebulizer still provides analytical performance that is superior to the performance of V-groove nebulizers and is comparable to or exceeds the performance of concentric nebulizers.

The gas capillary has a non-tapered body and a tapered end, where the tapered end is configured to generate increased gas pressure at the gas orifice compared to the gas pressure within the body. The cover plate may be positioned such that a gas stream exiting the gas capillary will impact the inner surface of the cover plate without any appreciable amount of gas that fails to impact the inner surface of the cover plate when gas exits the gas orifice within a pressure range that is typically used in nebulizers used for sample introduction into ICP-MS instruments. The cover plate may alternatively be positioned such that a gas stream exiting the gas capillary will not impact the cover plate to any appreciable extent when a gas stream exits the gas orifice. The distance between the gas orifice and the cover plate may be small, such that the gas stream will have a narrow conical profile when it impacts the inner surface of the cover plate. As a result, the gas stream will impact a small surface area of the inner surface of the cover plate. This will lead to increased pressure, which results in increased atomization efficiency of liquid that is drawn into the gas stream. Increased atomization efficiency will generate smaller, more consistent aerosol particles. This leads to increased analytical precision and sensitivity for liquid samples introduced into an analytical instrument using the disclosed nebulizer, even at low sample uptake rates.

In some preferred embodiments, the nebulizer may be formed from glass or quartz. In some alternate embodiments, the nebulizer may be formed from one or more polymers such as plastic materials. In other alternate embodiments, the nebulizer may be formed from one or more metals or alloys. In still other alternate embodiments, the nebulizer may be formed from a combination of two or more of glass, quartz, polymers, metals, and alloys.

The disclosed nebulizer is capable of handling high solid content samples, and it also offers atomization efficiency and analytical precision and sensitivity comparable to or exceeding that of concentric nebulizers at low sample uptake rates, as required for use in ICP-MS instruments.

BRIEF DESCRIPTION OF THE DRAWINGS

The figures provided herewith are intended to illustrate but not to limit the invention.

FIG. 4A illustrates a tapered end. FIG. 4B illustrates a reverse-tapered end. FIG. 4C illustrates a non-tapered end.

DETAILED DESCRIPTION OF THE ILLUSTRATED EMBODIMENTS

Figure 1:
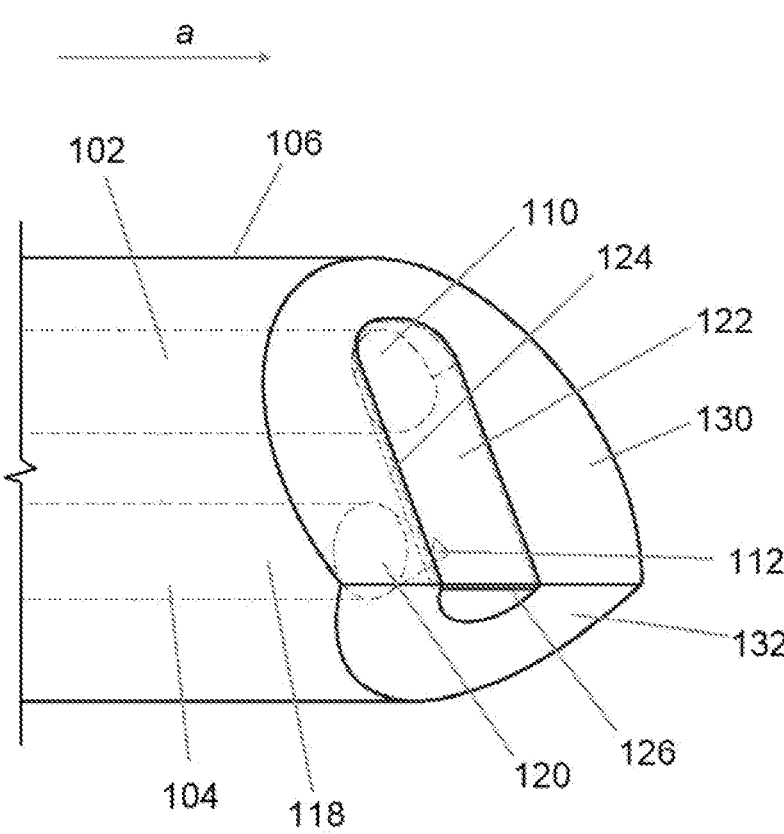
FIG. 1 shows the distal end of an embodiment of the disclosed nebulizer.

A thin film induction nebulizer is disclosed herein. The disclosed nebulizer has a gas capillary and a liquid capillary that are aligned in the same direction within a nebulizer housing and are substantially aligned with a main axis of the nebulizer housing. The nebulizer includes a liquid opening configured to allow liquid to exit the liquid capillary and a gas orifice configured to allow gas to exit the gas capillary. The liquid capillary opens into a chamber that is formed from a liquid channel and a cover plate. The cover plate interfaces with the liquid channel to partially seal the chamber. The chamber includes an opening where the liquid opening opens into the chamber and also includes another opening proximal to the gas orifice. The liquid channel has a roughened surface. The liquid channel may be partially situated between the liquid opening and the gas orifice and also extend beyond the gas orifice in a direction away from the liquid opening. Alternatively, the liquid channel may be situated entirely between the liquid opening and the gas orifice. The end of the nebulizer housing that is proximal to the liquid opening and the gas orifice includes two angled exterior surfaces. The angled exterior surfaces include a liquid-side surface and a gas-side surface. The liquid-side surface is positioned at an obtuse angle with respect to the main axis of the nebulizer housing, where the angle is measured at the outside edge of the nebulizer housing. The gas-side surface is also positioned at an obtuse angle with respect to the main axis of the nebulizer housing, where the angle is measured at the outside edge of the nebulizer housing. The liquid-side surface and the gas-side surface may be positioned orthogonally to each other, or alternatively may be positioned at an acute or obtuse angle with respect to each other. The cover plate has an inner surface and an outer surface. The cover plate may extend along the same plane as the liquid-side surface, or may alternatively extend along a plane substantially parallel to the plane of the liquid-side surface. The cover plate may extend along the plane of the liquid-side surface from an interface between an edge of the liquid-side surface that is aligned along the main axis of the nebulizer housing with the edge of the liquid opening that is substantially distal from the gas orifice, along an interface with the liquid channel, and toward the opening of the chamber that is proximal to the gas orifice. In some embodiments, the cover plate may form an integrated part of the liquid-side surface.

The roughened surface of the liquid channel allows wetting of the liquid channel with liquid that exits from the liquid opening. The liquid may preferably form a thin film within the liquid channel upon exiting the liquid opening.

A liquid that is introduced into the chamber from the liquid capillary via the liquid opening may form a thin film on the liquid channel. The liquid may be drawn into the gas stream by both induction and suction. Because the chamber is partially enclosed, induction will be increased as compared to an unenclosed chamber. This will lead to some suction into the gas stream of liquid that is forming a thin film in the liquid channel, and will also increase the consistency of liquid being drawn into the gas stream.

The disclosed nebulizer may use a large inner diameter liquid capillary without negative impacts on its performance. This is because the induction and suction draws liquid from the thin film rather than directly from the liquid opening. Typically, a large inner diameter liquid capillary leads to inconsistency in sample delivery at low sample uptake rates. Here, because the liquid is drawn from the thin film and induction is increased in the chamber, the sample delivery will be highly consistent even at low sample uptake rates.

Because the liquid capillary has a large inner diameter, the disclosed nebulizer is highly suitable for introducing unfiltered liquid samples and liquid samples with a high salt content. The large inner diameter liquid capillary of the disclosed nebulizer more reliably handles samples that include particulates than current nebulizer designs. Moreover, the liquid capillary may preferably have the same inner diameter along the length of the capillary, without restrictions that narrow the capillary diameter. The inner diameter of the liquid capillary may be comparable to that of V-groove nebulizers, while the disclosed nebulizer still provides analytical performance that is superior to the performance of V-groove nebulizers and is comparable to or exceeds the performance of concentric nebulizers.

The gas capillary has a non-tapered body and a tapered end, where the tapered end is configured to generate increased gas pressure at the gas orifice compared to the gas pressure within the body. The cover plate may be positioned such that a gas stream exiting the gas capillary will impact the inner surface of the cover plate without any appreciable amount of gas that fails to impact the inner surface of the cover plate when gas exits the gas orifice within a pressure range that is typically used in nebulizers used for sample introduction into ICP-MS instruments. The cover plate may alternatively be positioned such that a gas stream exiting the gas capillary will not impact the cover plate to any appreciable extent when a gas stream exits the gas orifice. The distance between the gas orifice and the cover plate may be small, such that the gas stream will have a narrow conical profile when it impacts the inner surface of the cover plate. As a result, the gas stream will impact a small surface area of the inner surface of the cover plate. This will lead to increased pressure, which results in increased atomization efficiency of liquid that is drawn into the gas stream. Increased atomization efficiency will generate smaller, more consistent aerosol particles. This leads to increased analytical precision and sensitivity for liquid samples introduced into an analytical instrument using the disclosed nebulizer, even at low sample uptake rates.

In some preferred embodiments, the nebulizer may be formed from glass or quartz. In some alternate embodiments, the nebulizer may be formed from one or more polymers such as plastic materials. In other alternate embodiments, the nebulizer may be formed from one or more metals or alloys. In still other alternate embodiments, the nebulizer may be formed from a combination of two or more of glass, quartz, polymers, metals, and alloys.

The disclosed nebulizer is capable of handling high solid content samples, and it also offers atomization efficiency and analytical precision and sensitivity comparable to or exceeding that of concentric nebulizers at low sample uptake rates, as required for use in ICP-MS instruments.

FIG. 1 shows the distal end of an embodiment 100 of the disclosed nebulizer. Nebulizer 100 includes a liquid capillary 102 and a gas capillary 104 aligned in the same direction and enclosed within a nebulizer housing 106. The liquid capillary 102 terminates in a liquid opening 110 and the gas capillary terminates in a gas orifice 112. The gas capillary 104 includes a non-tapered body 118 and a tapered end 120. The liquid opening 110 opens into a chamber 122 that is formed between a liquid channel 124 and a cover plate 126. The gas orifice 112 also opens into the chamber 122, near the opening of the chamber that is distal to the liquid opening 110. A liquid-side surface 130 is positioned at an obtuse angle with respect to the main axis a of the nebulizer housing 106. A gas-side surface 132 is also positioned at an obtuse angle with respect to the main axis α of the nebulizer housing 106.

Figure 2:
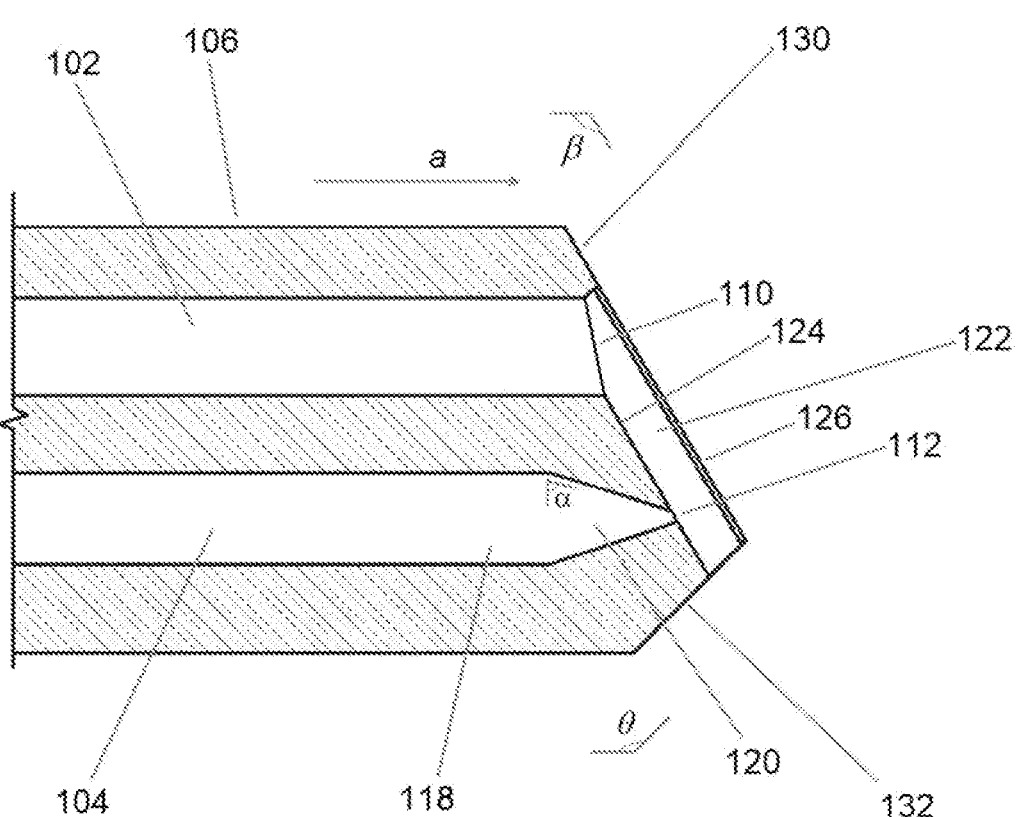
FIG. 2 illustrates a cross-sectional view of the distal end of the embodiment shown in FIG. 1.

FIG. 2 illustrates a cross-sectional view of the distal end of nebulizer 100, showing the liquid capillary 102, the gas capillary 104 including the non-tapered body 118 and the tapered end 120 that is tapered at an angle α, the nebulizer housing 106, the liquid opening 110, the gas orifice 112, and the chamber 122 that is formed between the liquid channel 124 and the cover plate 126. FIG. 2 also shows the angle between the liquid-side surface 130 and the main axis α of the nebulizer housing 106, and the angle θ between the gas-side surface 132 and the main axis α of the nebulizer housing 106.

Figure 3:
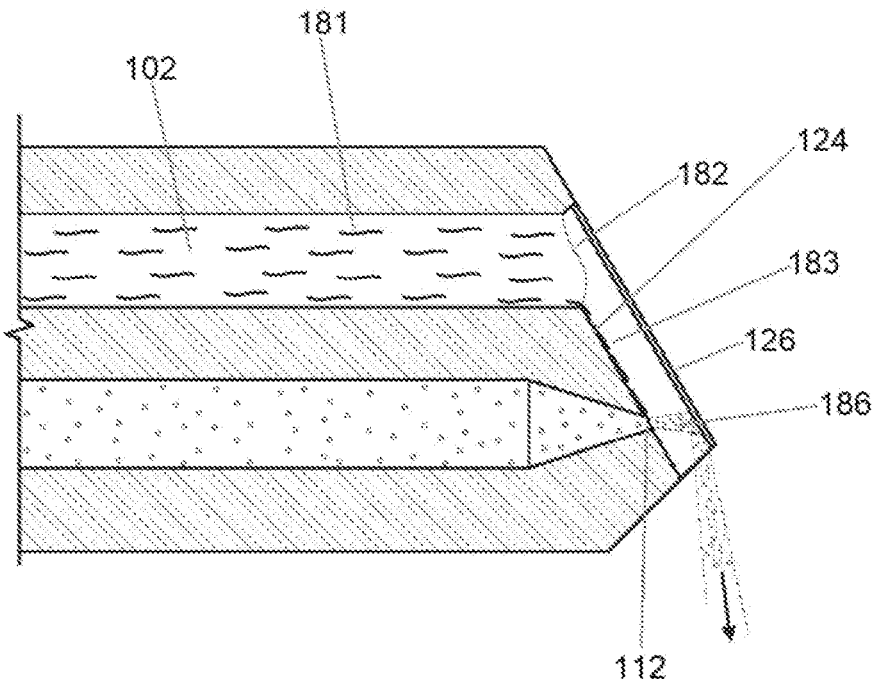
FIG. 3 illustrates the cross-sectional view of FIG. 2 showing a liquid exiting the liquid opening being drawn into a gas stream exiting the gas orifice.

FIG. 3 illustrates the cross-sectional view of FIG. 2 with a liquid 181 having a meniscus 182 and exiting the liquid capillary 102 to form a thin film 183 on the surface of the liquid channel 124, and a gas stream 186 exiting from the gas orifice 112 and impacting the cover plate 126.

In some embodiments, the liquid capillary and gas capillary may be substantially parallel.

When a gas is introduced via the gas capillary, the tapered end of the gas capillary causes the velocity of the gas to increase, as compared to the velocity of the gas within the body of the gas capillary. The high velocity gas exits the gas capillary via the gas orifice as a gas stream and generates induction near the gas orifice in accordance with the Venturi effect. The higher velocity of the gas leads to increased induction. In addition, the higher velocity of the gas also corresponds to increased kinetic energy, which leads to increased atomization of the liquid drawn into the gas stream.

The performance characteristics of nebulizers having tapered-end capillaries have been compared to the performance characteristics of nebulizers having non-tapered flat-end capillaries. See, e.g., Geertsen, V., et al. "Influence of Design and Operating Parameters of Pneumatic Concentric Nebulizer on Micro-Flow Aerosol Characteristics and ICP-MS Analytical Performances." *J. Anal. At. Spectrom.* 2012, 27, 146, However, the comparisons are focused on the presence or absence of a tapered end at the end of a capillary, and not the abruptness of the tapering. Standard methods of fabricating nebulizers that have a tapered-end gas capillary from materials such as glass, quartz, and polymers typically generate a tapered end that has relatively gradual tapering. As a result, existing nebulizers that include a tapered-end gas capillary have relatively gradual tapering.

In some embodiments, the tapered end of the gas capillary may be abruptly tapered. In some other embodiments, the tapered end of the gas capillary may be gradually tapered. It has recently been observed by the inventors of the present application that increased abruptness of the tapering at the end of the gas capillary may provide superior results with respect to both induction of a thin film of liquid and subsequent atomization of liquid drawn into the gas stream by induction.

In embodiments with a tapered end that has the design shown in FIGS. 1-3, the tapered end of the gas capillary end may preferably extend 0.1-6.0 mm from the non-tapered body of the gas capillary to the gas orifice.

In embodiments with a tapered end that has the design shown in FIGS. 1-3 and in which the tapered end of the gas capillary is abruptly tapered, the tapered end may preferably extend 0.25-2.5 mm from the non-tapered body of the gas capillary to the gas orifice, and more preferably may extend 0.25-1.0 mm from the non-tapered body of the gas capillary to the gas orifice.

In embodiments with a tapered end that has the design shown in FIGS. 1-3, the inner diameter of the gas orifice may preferably be 0.10-0.30 mm, more preferably may be 0.10-0.25 mm, and even more preferably may be 0.15-0.20 mm.

In embodiments with a tapered end that has the design shown in FIGS. 1-3, the angle ($\alpha$) of the taper may preferably be 3.0-89 degrees, and more preferably may be 34-54 degrees.

In embodiments with a tapered end that has the design shown in FIGS. 1-3, the inner diameter of the non-tapered bad of the gas capillary may preferably be 0.50-4.0 mm and more preferably may be 0.80-3.5 mm.

Figure 4A:
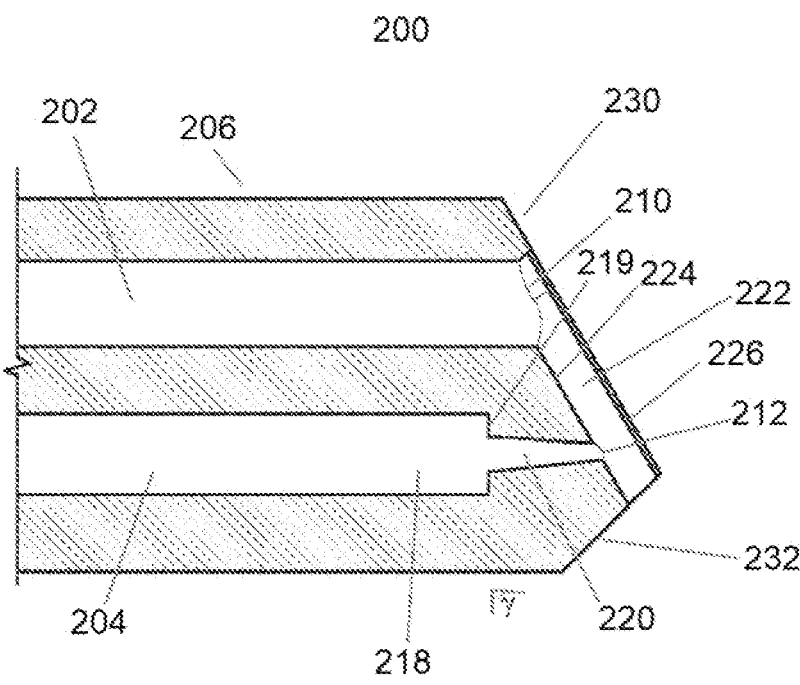
FIGS. 4A-4C illustrate alternate embodiments of the disclosed nebulizer that have an abrupt decrease in diameter at the interface between the non-tapered body and the end of the gas capillary.
Figure 4B:
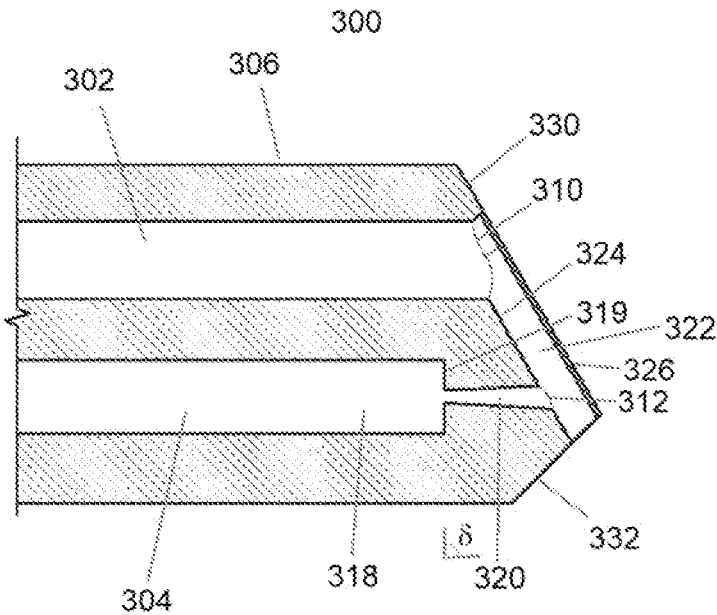
Figure 4C:
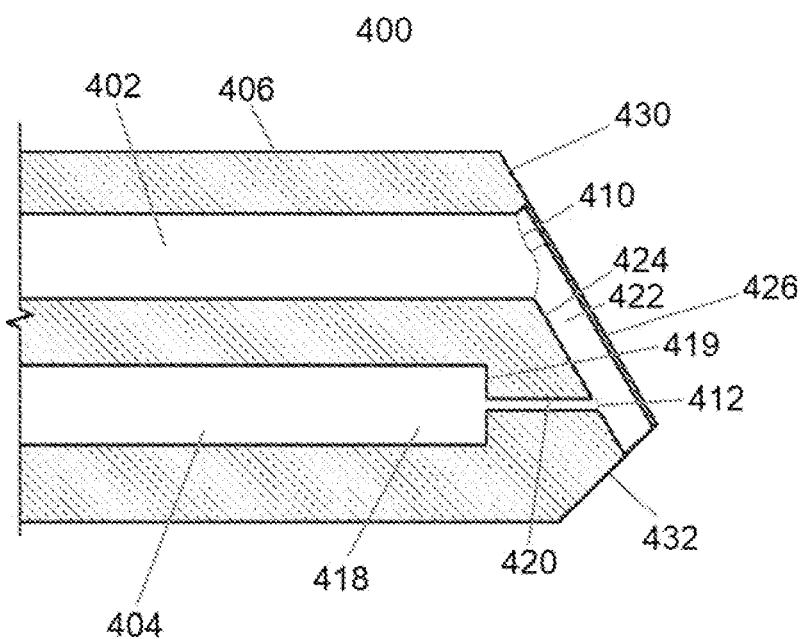

FIGS. 4A-4C illustrate alternate embodiments 200, 300, and 400 of the disclosed nebulizer that have an abrupt decrease in diameter at the interface between the non-tapered body and the end of the gas capillary.

FIG. 4A illustrates a cross-sectional view of the distal end of nebulizer 200, showing the liquid capillary 202, the gas capillary 204 including the non-tapered body 218 and the tapered end 220, the nebulizer housing 206 that has a liquid-side surface 230 and a gas-side surface 232 at its end, the liquid opening 210, the gas orifice 212, and the chamber 222 that is famed between the liquid channel 224 and the cover plate 226. There is an abrupt decrease in diameter at the interlace 219 between the non-tapered body 218 and the tapered end 220 of the gas capillary. The interface 219 is a surface that is substantially perpendicular to the direction of gas flow through the non-tapered body 218. The tapered end 220 is tapered at an angle γ.

FIG. 4B illustrates a cross-sectional view of the distal end of nebulizer 300, showing the liquid capillary 302, the gas capillary 304 including the non-tapered body 318 and the reverse-tapered end 320, the nebulizer housing 306 that has a liquid-side surface 330 and a gas-side surface 332 at its end, the liquid opening 310, the gas orifice 312, and the chamber 322 that is formed between the liquid channel 324 and the cover plate 326. There is an abrupt decrease in diameter at the interface 319 between the non-tapered body 318 and the reverse-tapered end 320 of the gas capillary. The interface 319 is a surface that is substantially perpendicular to the direction of gas flow through the non-tapered body 318. The reverse-tapered end 320 is tapered at an angle δ.

FIG. 4C illustrates a cross-sectional view of the distal end of nebulizer 400, showing the liquid capillary 402, the gas capillary 404 including the non-tapered body 418 and the non-tapered end 420, the nebulizer housing 406 that has a liquid-side surface 430 and a gas-side surface 432 at its end, the liquid opening 410, the gas orifice 412, and the chamber 422 that is formed between the liquid channel 424 and the cover plate 426. There is an abrupt decrease in diameter at the interface 449 between the non-tapered body 418 and the non-tapered end 420 of the gas capillary. The interface 419 is a surface that is substantially perpendicular to the direction of gas flow through the non-tapered body 418.

The angle ($\beta$) between the liquid-side surface and the main axis a of the nebulizer housing may preferably be 105-135 degrees, and may more preferably be 115-125 degrees. The angle ($\theta$) between the gas-side surface and the main axis a of the nebulizer housing may preferably be 130-160 degrees, and may more preferably be 140-155 degrees.

The distance between the center of the liquid opening and the cover plate along the main axis of the nebulizer housing may preferably be 0.2-0.9 mm, and more preferably may be 0.4-0.6 mm.

The length of the cover plate as measured from its point of attachment to the nebulizer housing may preferably be 2.6-4.0 mm, and more preferably may be 2.8-3.3 mm.

The cover plate may preferably extend approximately 0.10-0.70 mm below the center of the gas orifice, and more preferably may extend approximately 0.02-0.60 mm below the center of the gas orifice.

The length of the liquid channel is defined as the distance between the edge of the liquid opening proximal to the gas orifice and the edge of the gas orifice proximal to the liquid opening. The length of the liquid channel may preferably be 0.50-4.3 mm, more preferably may be 1.2-13 mm, and even more preferably may be 1.4-1.6 mm.

In some embodiments, the length of the liquid channel may preferably be at least 1.0 mm.

The roughened surface of the liquid channel generates increased surface tension, which causes liquid exiting the liquid opening to wet the surface of the liquid channel. Because the thin film does not extend beyond the liquid channel, all of the liquid exiting the liquid opening is drawn into the gas stream that exits the gas orifice by induction or suction and is subsequently atomized within the gas stream. This is a significant improvement over the thin films formed using the Babington design, as the disclosed nebulizer does not waste any of the liquid that exits from the liquid opening.

In some embodiments, a peristaltic pump may be used to pump liquid through the liquid capillary. The thickness of the thin film may vary during the pumping cycles. As discussed above, it has been observed that all of the liquid exiting the liquid opening is drawn into the gas stream and no liquid falls off as droplets. While the surface will bulge and flatten as the liquid flow pulses during pumping, the thin film will only be present in the liquid channel and the liquid will remain in the liquid channel until it is drawn into the gas stream. As a result, pump surges will not affect the induction or suction near the gas no Because all of the liquid is drawn into the gas stream even with a large liquid opening, it is possible to use a large inner diameter liquid capillary.

The disclosed nebulizer provides numerous advantages over existing nebulizer designs. A large inner diameter liquid capillary without any restriction points is more resistant to plugging, and thus larger particulates present in a sample need not be filtered out prior to introduction of the sample into the nebulizer. The large inner diameter also provides more reliability and stability for samples with high quantities of salts or total dissolved solids. Even samples that are saturated with salts are unlikely to cause plugging via crystallization of the salts.

Embodiments of the disclosed nebulizer were shown to even be capable of handling slurries, which generally require a nebulizer design such as a V-groove that is specifically designed for use with high solid content samples at the expense of lower analytical precision and sensitivity and that additionally may exhibit suboptimal performance at low sample uptake rates.

The inner diameter of the liquid capillary may preferably be between 0.35 mm and 2.5 mm, more preferably between 0.50 mm and 2.0 mm, and even more preferably between 0.65 mm and 1.5 mm. Commercially available nebulizers with large inner diameter liquid capillaries typically have a liquid capillary with a maximum inner diameter of 0.75-0.80 mm. Modified versions of these nebulizers that are suitable for use in applications requiring low sample uptake rates typically have even smaller inner diameter liquid capillaries, typically 0.25-0.50 mm or even less. Thus the disclosed nebulizer may offer significantly enhanced sample analysis capabilities compared to current nebulizer designs used in applications requiring low sample uptake rates.

The inner diameter of tubing that is used to deliver samples to a nebulizer used in an application requiring low sample uptake rates is typically 0.25-0.75 mm. Thus any particulates with diameters above these values will not enter the nebulizer. As a result, the use of a large inner diameter liquid capillary according to the more preferred inner diameter ranges disclosed herein essentially eliminates plugging from particulates.

The disclosed nebulizer has significantly better analytical precision and sensitivity than existing nebulizers that are capable of handling high solid content samples, such as V-groove nebulizers, and its analytical precision and sensitivity is comparable to or even exceeds those of concentric nebulizers. The disclosed nebulizer also shows better long-term stability than existing V-groove nebulizers.

As the primary disadvantage of concentric nebulizers is the small and restricted diameters of both the liquid and gas capillaries that leads to plugging from even small particles, the development of a nebulizer that is capable of both handling high solid content samples and offering a similar level of analytical precision and sensitivity as concentric nebulizers for applications requiring low sample uptake rates is highly advantageous.

The large inner diameter liquid capillary also significantly reduces the amount of maintenance required to maintain optimum nebulizer performance. This leads to increased productivity due to fewer interruptions for maintenance.

The use of a partially sealed chamber increases the induction that is used to draw liquid into the gas stream it is postulated that this is a result of the small volume of the chamber leading to a more significant reduction in pressure than is observed when induction is occurring in a larger open area, as in existing nebulizers.

The disclosed nebulizer includes an impact surface that is in close proximity to the gas orifice. It is postulated that a gas stream exiting the gas orifice will assume a conical shape that expands with increasing distance from the gas orifice. Thus, by placing the impact surface in close proximity to the gas orifice, the surface area subjected to gas impact is small and the energy imparted by the gas stream upon impact is imparted upon a small area. This increases energy transfer efficiency, which leads to the generation of smaller aerosol droplets.

The disclosed nebulizer is suitable for use with low sample introduction flow rates.

Methods of introducing a sample into an instilment using the disclosed nebulizer are also disclosed herein. The method may comprise: (1) introducing a liquid into the liquid capillary; (2) introducing a gas into the gas capillary to generate a gas stream exiting the gas orifice; (3) drawing the liquid into the gas stream by induction and, in some embodiments, also by suction; (4) atomizing the liquid that is drawn into the gas stream to generate atomized liquid particles in the gas stream; (5) removing atomized liquid particles that are above a threshold diameter from the gas stream; and (6) introducing the gas stream containing atomized liquid particles with a diameter below or equal to the threshold diameter into an instrument.

In some embodiments, the disclosed methods may be suitable for sample introduction when the input gas pressure is 36-39 psi or 49-52 psi at a flow rate of approximately 1.0 L/min, as is typical for various spectroscopic applications for which the methods are suited.

The robust design of the disclosed nebulizer minimizes required maintenance thereof and also suggests the conclusion that the disclosed nebulizer will have an extended life expectancy.

The previous description of the disclosed embodiments is provided to enable any person skilled in the art to make or use the invention disclosed herein. Although the various inventive aspects are disclosed in the context of certain illustrated embodiments, implementations, and examples, it should be understood by those skilled in the art that the invention extends beyond the specifically disclosed embodiments to other alternative embodiments and/or uses of the invention and obvious modifications and equivalents thereof. In addition, while a number of variations of various inventive aspects have been shown and described in detail, other modifications that are within their scope will be readily apparent to those skilled in the art based upon reviewing this disclosure. It should be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. The generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

All references cited herein are hereby expressly incorporated by reference.

What is claimed is:

1. A nebulizer comprising:

a liquid capillary enclosed within a housing;

a gas capillary enclosed within the housing; and a cover plate;

wherein the liquid capillary and the gas capillary are aligned in parallel to each other within the housing and are also aligned with a main axis of the housing, wherein the housing comprises a tip comprising a liquid-side surface and a gas-side surface, wherein an angle between the liquid-side surface and the main axis of the housing is obtuse, wherein the liquid capillary comprises a liquid opening and the gas capillary comprises a gas orifice, wherein the distance between the edge of the liquid opening that is closest to the gas orifice and the edge of the gas orifice that is closest to the liquid opening is 1.2-3.3 mm, wherein the liquid capillary opens into a chamber that is formed from a liquid channel having a roughened surface and the cover plate, wherein the cover plate interfaces with the liquid channel to partially enclose the chamber, and wherein the chamber is enclosed on all sides except one.

2. The nebulizer of claim 1, wherein an angle between the gas-side surface and the main axis of the housing is obtuse.

3. The nebulizer of claim 1, wherein the nebulizer is formed from glass.

4. The nebulizer of claim 1, wherein the nebulizer is formed from quartz.

5. The nebulizer of claim 1, wherein the nebulizer is formed from one or more polymers.

6. The nebulizer of claim 1, wherein the nebulizer is formed from one or more metals or alloys.

7. The nebulizer of claim 1, wherein the nebulizer is formed from two or more materials selected from the group consisting of glass, quartz, polymers, metals, and alloys.

8. The nebulizer of claim 1, wherein the liquid capillary has an inner diameter of between 0.65 mm and 1.5 mm.

9. The nebulizer of claim 8, wherein an angle between the gas-side surface and the main axis of the housing is obtuse.

10. The nebulizer of claim 8, wherein the nebulizer is formed from glass.

11. The nebulizer of claim 8, wherein the nebulizer is formed from quartz.

12. The nebulizer of claim 8, wherein the nebulizer is formed from one or more polymers.

13. The nebulizer of claim 8, wherein the nebulizer is formed from one or more metals or alloys.

14. The nebulizer of claim 8, wherein the nebulizer is formed from two or more materials selected from the group consisting of glass, quartz, polymers, metals, and alloys.

15. The nebulizer of claim 8, wherein the gas capillary has a non-tapered body and a tapered end, wherein the tapered end is not more than 1.0 mm in length.

16. The nebulizer of claim 8, wherein the gas capillary has a non-tapered body and a tapered end, wherein the tapered end is tapered at a 34-54° angle.

17. The nebulizer of claim 15, wherein the gas capillary has a non-tapered body and a tapered end, wherein the tapered end is tapered at a 34-54° angle.

18. The nebulizer of claim 1, wherein the gas capillary has a non-tapered body and a tapered end, wherein the tapered end is not more than 1.0 mm in length.

19. The nebulizer of claim 18, wherein the gas capillary has a non-tapered body and a tapered end, wherein the tapered end is tapered at a 34-54° angle.

20. The nebulizer of claim 1, wherein the gas capillary has a non-tapered body and a tapered end, wherein the tapered end is tapered at a 34-54° angle.

* * * * *